Nov. 14, 1950 C. A. P. THOMAS 2,529,977
WARM AIR AND HOT WATER HEATING APPARATUS
Filed March 29, 1949 2 Sheets-Sheet 1
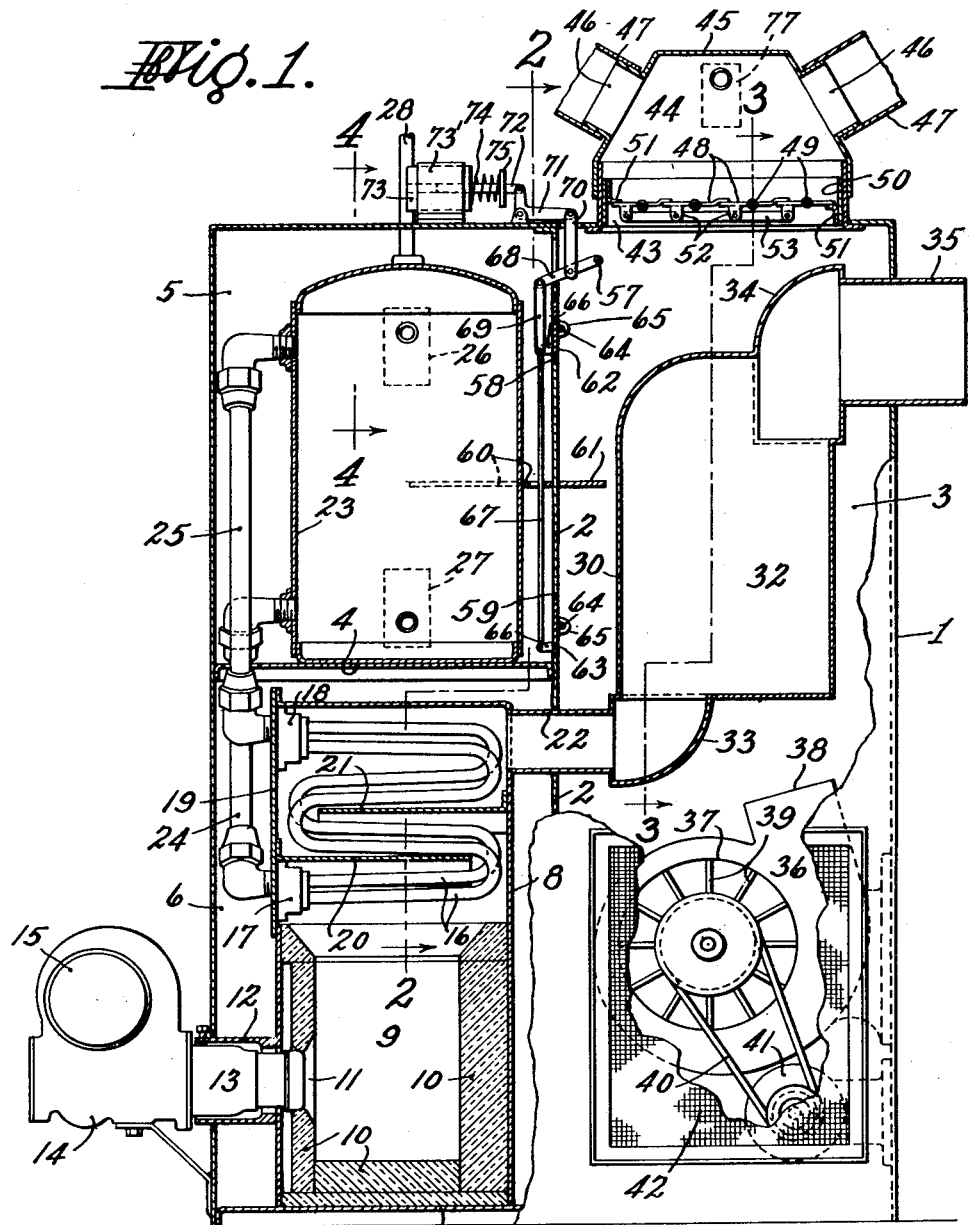
INVENTOR
CECIL A. P. THOMAS
BY Chapin + Neal
ATTORNEYS

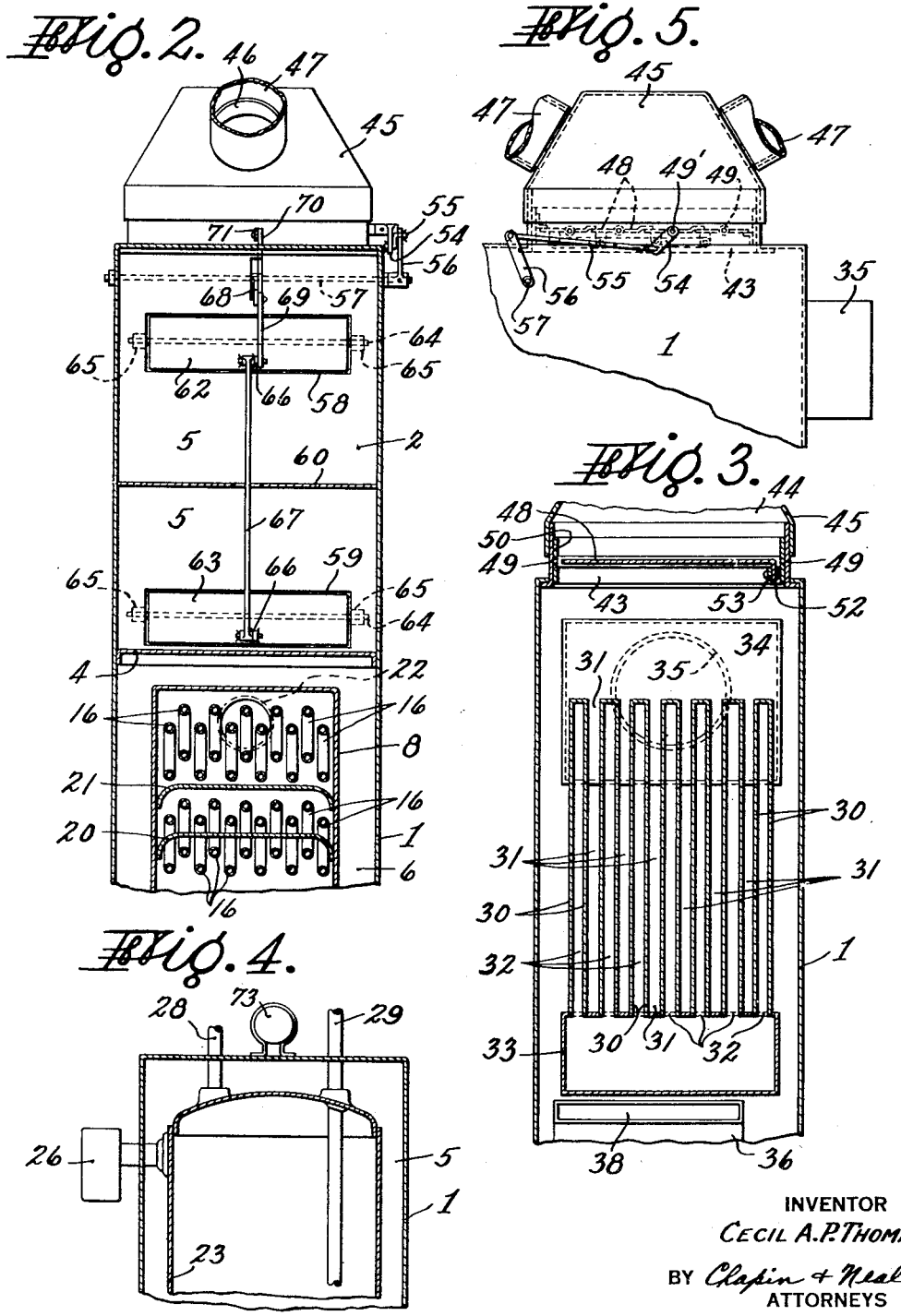

Patented Nov. 14, 1950

2,529,977

UNITED STATES PATENT OFFICE 2,529,977

WARM AIR AND HOT-WATER HEATING APPARATUS

Cecil A. P. Thomas, West Springfield, Mass., assignor to Gilbert & Barker Manufacturing Company, West Springfield, Mass., a corporation of Massachusetts Application March 29, 1949, Serial No. 84,197

6 Claims. (Cl. 126—101)

1

This invention relates to improvements in heating apparatus adapted for heating rooms by means of warm air and also for heating the domestic supply of hot water.

The invention has for one object the provision in such an apparatus of means for preventing warm air from leaving the apparatus when it is operated solely for the purpose of heating the domestic hot water supply.

The invention has for another object the provision of means operable when the apparatus is used for the purpose of room heating to utilize the hot water storage tank as an auxiliary heat exchange unit for the purpose of heating air.

These objects will best be understood from the detailed description of the one illustrative example of the invention in the accompanying drawings, in which:

Fig. 1 is a sectional elevational view of a combined warm air furnace and hot water heater embodying the invention;

Figs. 2, 3 and 4 are fragmentary cross sectional views taken on the lines 2—2, 3—3 and 4—4, respectively of Fig. 1;

Fig. 5 is a fragmentary side elevational view, showing the means for actuating the closure means for the warm air outlet of the furnace; and Fig. 6 is a diagrammatical view illustrative of means for actuating the burner, fan and the various valve means.

Referring to these drawings and first to Fig. 1 thereof, a casing 1 is subdivided by a vertical partition 2, forming between the latter and the right hand vertical wall of the casing a chamber 3. The space between the partition 2 and the left hand vertical wall of the casing is subdivided by a horizontal partition 4 into upper and lower chambers 5 and 6, respectively.

Mounted within the chamber 6 in spaced relation with the vertical walls thereof and resting on the floor 7 of casing 1 is a casing 8, containing in its lower end a suitable combustion chamber 9, herein shown as having its bottom, side and end walls lined with refractory material 10. The combustion chamber has an open upper end, forming its outlet, and a horizontal opening 11 in one side wall thereof, forming the inlet and communicating with a tube 12, which is secured to casing 8 and extends horizontally across to and through the adjacent vertical wall of casing 1. This tube 12 receives the combustion tube 13 of a suitable gun-type oil burner 14, which is suitably supported from the casing 1, as indicated,

2 and which has an electric motor 15 for actuating it.

Above the combustion chamber 9 and located in the casing 8 is a heat exchange unit. This includes a plurality (eleven as shown in Fig. 2) of water-conducting pipes 16, each of which is bent back and forth forming four horizontal portions, located one above another. Such portions of one pipe are offset from the next pipe as shown. The lower ends of all the pipes 16 are connected to a common inlet header 17 and the upper ends of all the pipes are connected to a common outlet header 18. Both headers are suitably fixed to a removable panel 19, forming part of casing 8. A baffle 20 is also fixed to this panel and extends between the lowermost horizontal portion of each pipe 16 and the horizontal portions, which immediately overlie it, and toward but not to the wall of casing 8 opposite to panel 19. Another baffle 21 is fixed to the last-named wall of casing 8 and extends between the two intermediate horizontal portions of pipes 16 and toward but not to the panel 19. The panel, all the pipes 16, the headers 17 and 18 and baffle 20 may be removed from casing 8 as one unit. The casing 8 has an outlet for gases at its right hand upper end and this outlet is connected to a flue 22, leading through the vertical partition 2 to another heat exchange unit or radiator which will be later described and which is located in the upper part of chamber 3.

Located in the chamber 5 and supported from the partition 4 is a storage tank 23 for hot water. The lower part of this tank is connected by a pipe 24 to the inlet header 17 and the upper portion of the tank is connected to the outlet header 18 by a pipe 25. Connected to the upper and lower portions of tank 23 are hot water thermostat switches 26 and 27, respectively. Connected to the dome of tank 23 is an outlet pipe 28 for hot water. A cold water inlet pipe 29 (Fig. 4) extends through the dome of tank 23 downwardly therein, terminating near but above the base of the tank in the usual manner.

The second heat exchange unit or radiator, which is located in chamber 3, comprises a plurality (seven as shown in Fig. 3) of thin, hollow and approximately rectangular flues 30, mounted in laterally spaced relation. Between these flues are air passages 31 and within them are gas passages 32. All the gas passages are connected at their lower left hand portions, as viewed in Fig. 1, to an inlet header 33, to which the described flue 22 is also connected. All the gas passages 31 are also connected near their right hand upper portions to an outlet header 34, to which is connected the outlet pipe 35, which extends out of a side wall of casing 1 and is adapted for connection to the stack. The casing 8, flue 22, header 33, passages 32 and header 34 constitute gas conducting passage means for connecting the outlet of combustion chamber 9 to the outlet 35.

Located in the lower end of chamber 3 beneath the heat radiator, just described, is a fan casing 36, supported from a side wall of casing 1. Casing 36 has an inlet 37 in at least one of its end walls and an outlet 38 which is so located as to blow air upwardly through the several air passages 31 of the radiator. Within casing 36 is a fan 39, driven by a belt 40 and suitable pulleys from an electric motor 41, supported from a side wall of casing 1 below the fan casing. One or more cold air inlets are provided in the casing 1 through a filter 42. In Fig. 1, part of a side wall of the casing 1 is shown and in it a portion of the filter described. Cool air drawn in by fan 39 through the filter 42 is forced out the outlet 38 and flows upwardly in chamber 3 through the air passages 31 and along all sides of the radiator to the upper end of chamber 3 where it leaves through an outlet 43 formed in the top wall of casing 1. From this outlet, the air enters a plenum chamber 44, formed in a casing 45 surmounting the top wall of casing 1. The casing 45 may have one or more outlet nipples 46 for connection to warm air distributing pipes 47.

The outlet 43 may be controlled by any suitable valve means, herein exemplified by a plurality (four as shown in Fig. 1) of rectangular shutters 48, each having at each end central trunnions 49, rotatably mounted (see Fig. 3) one in each of two opposite walls of a hollow rectangular frame 50, which closely fits the rectangular walls of outlet 43. The several shutters 48 overlap as shown in Fig. 1 and the two end shutters of the series overlap the inturned flanges 51 on frame 50, whereby the outlet 43 is completely closed when the shutters are positioned horizontally as shown. Each shutter 48 has a depending ear 52 and these several ears are pivotally connected at longitudinally spaced points to a link 53. Thus, when one shutter is moved all the others will be compelled to move with it. One of the trunnions, marked 49' in Fig. 5, is extended far enough to have fixed to its outer end a crank 54, which is connected by a link 55 to a crank 56, fixed to a shaft 57, suitably mounted in the side walls of casing 1, as indicated in Fig. 2, and actuated by means later to be described.

Means are provided, whereby some of the air supplied by fan 39 may be circulated in the chamber 5 to effect a heat exchange with the hot water storage tank 23. Such means include upper and lower openings 58 and 59 (Figs. 1 and 2) in partition 2, and a baffle 60 extending horizontally from the partition, at a location about midway between the top and bottom of chamber 5, to the tank 23 and encircling approximately half of the tank. If desired, a second horizontal baffle 61 may extend from the other side of the partition 2 part way into chamber 3. For controlling the circulation of air through chamber 5 at least one of the openings 58 or 59 should be controlled by a valve. As herein shown both openings 58 and 59 are controlled by dampers 62 and 63, respectively. Each damper has fixed thereto a central shaft 64, which is rotatably mounted in bearings 65, fixed to partition 2. When the dampers 62 and 63 are opened, some of the air forced upwardly in chamber 3 by fan 39 may flow in through opening 59, around the lower portion of tank 23 beneath baffle 60, then pass upwardly around the end of this baffle, then flow around the upper part of the tank and out through opening 58.

The dampers 62 and 63 have ears 66 (Fig. 2) thereon, projecting into chamber 5, and these are interconnected by a link 67 so that the dampers will move in unison. The above described shaft 57 has fixed thereto at a central point an arm 68, which extends through a slot in partition 2 (Fig. 1) into the chamber 5. The inner end of arm 68 (Fig. 2) is connected by a link 69 to the ear 66 on damper 62. Arm 68 is connected by a link 70 (Fig. 1), which passes upwardly through a slot in the top of casing 1, to one arm of a bellcrank 71, pivotally mounted at a point intermediate its ends on the top wall of casing 1. The other arm of bellcrank 71 is pivotally connected to the outer end of the plunger 72 of a solenoid 73, suitably fixed as by a strap 73' to said top wall. A spring 74, acting between one end face of the solenoid and a collar 75 fixed on plunger 72, normally holds the bellcrank in the illustrated position, in which the dampers 62 and 63 are closed as well as the shutters 48, which, it will be remembered, are also actuated from shaft 57. On energization of solenoid 73, all the shutters and both dampers will be turned ninety degrees into wide open position.

In Fig. 6, there has been shown in diagrammatical form a control system for the heating apparatus. The burner motor 15 is controlled by a room thermostat switch 76. The fan motor 41 is controlled by a thermostat switch 77, which is shown in Fig. 1 as mounted in the plenum chamber 44 of the heating apparatus to respond to the temperature of the air heated by the apparatus, closing when the temperature of such air exceeds a predetermined degree. The room thermostat 76 is included in series in an electrical circuit which may be traced as follows, from one supply wire 78, wires 79 and 80, room thermostat switch 76, wires 81 and 82, motor 15, and wires 83 and 84 to the other supply wire 85. The dome thermostat 77 is included in a series circuit with motor 41, which circuit may be traced as follows, from one supply wire 78, wire 86, switch 77, wire 87, motor 41 and wire 88 back to the other supply wire 85. The burner motor 15 may also be controlled by the lower hot-water thermostat 27 by the following circuit, from one supply wire 78, wires 79 and 89, switch 27, motor 15, and wires 83 and 84, and wire 90 to the other supply wire 85. The solenoid 73 is controlled by the upper hot water thermostat 26 and a circuit which may be traced as follows, from one supply wire 78, by wire 91, switch 26, wire 92, solenoid 73 and wires 93 and 84 to the other supply wire 85.

In operation, on a demand for hot water heating, as manifested by the closing of thermostat 27 on a drop in temperature of the water in storage tank 23 below a predetermined degree, the burner motor 15 will be started and combustion will occur in the chamber 9. The hot gases will travel upwardly past pipes 21, heating the water therein, and thence through flue 22, header 33, passages 32, header 34 and flue 35 to the stack. The water heated in pipes 21 will rise into the storage tank by pipe 25 and the cooler water in the tank will flow through pipe 24 into the pipes 21. When the temperature in the tank reaches the desired degree, switch 27 will open and stop the burner. The thermostat 26 is arranged to close, when the water in tank 23 rises to a temperature considerably higher than the temperature at which thermostat 27 opens. Consequently, when the burner operates on a demand for hot water heating, the thermostat 26 will not close and solenoid 73 will not be energized, wherefore all the shutters 48 remain closed and the dampers 62 and 63 remain closed. Consequently, the air which is heated by the passage of the hot gases through passages 32 will not escape to the distributing pipes 47 and heat the rooms of the house. There will be no circulation of air through the apparatus because the shutters 48 are closed.

When the burner operates in response to a demand for room heating, as manifested by the closing of room thermostat switch 76 on a drop in temperature below a predetermined degree, the action will initially be as just described. There will be a heat exchange between the gases and the water and a heat exchange between the gases and the air. As the temperature of the water in the tank rises, switch 27 will open but this will not stop burner 15 because switch 76 shunts it out. Continued rise in the temperature of the water in tank 23 will cause switch 26 to open and this will cause the shutters 48 to be opened, thereby allowing air to flow from the cold air inlet, through fan casing 36, through chamber 3 and passages 31, to and through the outlet 43 into plenum chamber 44 and thence through the distributing pipes 47 to the rooms or space to be heated. Ordinarily, the shutters 48 will open in a few minutes, say three or four, after the burner is started. The opening of dampers 62 and 63 enables some of the air to flow through chamber 5 and effect a heat exchange with the water in tank 23. The latter therefore supplements the radiator in chamber 3, as an air heating means.

Whenever the air in the plenum chamber 44 reaches a predetermined temperature, the dome thermostat switch 77 will close and start motor 41, driving the fan 39, to increase the rate of air flow through the chamber 5.

When the rooms are heated to the desired degree, thermostat 76 will open and stop the burner, but the fan 39 will continue to operate until the dome thermostat 77 opens to stop it. Also, the shutters 48 will remain open until the temperature of the water in tank 23 falls sufficiently to open switch 26.

The controls described have been shown schematically in a form sufficient to disclose their functions. The controls, actually used, will be much more complicated and there will be various adjuncts and safety devices associated with them. These have been omitted to avoid unnecessary complications in the illustration and description.

Thus, I have provided an improved heating apparatus, which may be used for heating rooms by warm air and for heating the domestic water supply, and which is characterized in that the warm air outlet may be kept closed during a normal hot-water-heating operation and in that the hot water storage tank may be used as a supplementary heat exchange unit during room heating operation.

I claim:

1. Warm-air space-heating and hot-water heating apparatus, comprising, a casing having therein a chamber with an inlet for air to be heated and an outlet for heated air to flow to the space to be heated, valve means for opening or closing said outlet, a second casing forming a combustion chamber having an inlet and an outlet; gas-conducting passage means connected at one end to the second-named outlet, extending through the first-named chamber and terminating outside the latter with an outlet; said passage means including a radiator located in the first-named chamber for heating the air in such chamber, a storage tank for hot water; piping connected to said tank, forming with the tank a circulating system and located in part in said passage means; a burner connected to the inlet of and firing into said combustion chamber, a first control for the burner responsive to the temperature of the water in said tank for starting the burner when the temperature of such water falls to one predetermined value and for stopping the burner when the temperature of such water rises to a second predetermined value; a second control for the burner adapted to respond to the temperature of the air in the space to be heated and operable independently of the first-named control to start the burner when the temperature in said space falls to one predetermined value, to continue the operation of the burner after the first control opens in response to the rise in temperature of the water in said tank, and to stop the burner when the temperature in said space rises to another predetermined value; and actuating means for said valve means responsive to the temperature of the water in said tank for opening and closing the valve means when the temperature of such water is respectively above or below a predetermined value higher than the second-named predetermined value.

2. Warm-air space-heating and hot-water heating apparatus, comprising, a casing having therein a first chamber with an inlet for air to be heated and an outlet for heated air to flow to the space to be heated and a second chamber with air inlet and outlet openings connecting with the first chamber, a valve for opening and closing one of said openings, a second casing forming a combustion chamber having an inlet and an outlet; gas-conducting passage means connected at one end to the last-named outlet, extending through the first-named chamber and terminating outside the latter with an outlet; said passage means including a radiator located in the first-named chamber for heating the air in such chamber, a storage tank for hot water located in the second chamber; piping connected to said tank, forming with the tank a circulating system and located in part in said passage means; a burner connected to the inlet of and firing into said combustion chamber, a first control for the burner responsive to the temperature of the water in said tank for starting the burner when the temperature of such water falls to one predetermined value for stopping the burner when the temperature of such water rises to a second predetermined value; a second control for the burner adapted to respond to the temperature of the air in the space to be heated and operable independently of the first-named control to start the burner when the temperature in said space falls to one predetermined value, to continue the operation of the burner after the first control opens in response to the rise in temperature of the water in said tank, and to stop the burner when the temperature in said space rises to another predetermined value; and actuating means for said valve responsive to the temperature of the water in said tank for opening and closing the valve when the temperature of such water is respectively above or below a predetermined value higher than the second-named predetermined value.

3. Warm-air space-heating and hot-water heating apparatus, comprising, a casing having therein a first chamber with an inlet for air to be heated and an outlet for heated air to flow to the space to be heated, and a second chamber with air inlet and outlet openings connecting with the first chamber, valve means for opening or closing said first-named outlet, a valve for opening and closing one of said openings, a second casing forming a combustion chamber having an inlet and an outlet; gas-conducting passage means connected at one end to the last-named outlet, extending through the first-named chamber and terminating outside the latter with an outlet; said passage means including a radiator located in the first-named chamber for heating the air in such chamber, a storage tank for hot water located in the second chamber; piping connected to said tank, forming with the tank a circulating system and located in part in said passage means; a burner connected to the inlet of and firing into said combustion chamber, a first control for the burner responsive to the temperature of the water in said tank for starting the burner when the temperature of such water falls to one predetermined value and for stopping the burner when the temperature of such water rises to a second predetermined value; a second control for the burner adapted to respond to the temperature of the air in the space to be heated and operable independently of the first-named control to start the burner when the temperature in said space falls to one predetermined value, to continue the operation of the burner after the first control opens in response to the rise in temperature of the water in said tank, and to stop the burner when the temperature in said space rises to another predetermined value; and actuating means for said valve means and valve responsive to the temperature of the water in said tank for opening and closing the valve means and valve when the temperature of such water is respectively above or below a predetermined value higher than the second-named predetermined value.

4. A warm-air space-heating and hot-water heating apparatus, comprising, a casing, partitions dividing said casing into first, second and third chambers, the first chamber extending from the bottom to the top of said casing, the second and third chambers being located alongside the first chamber and the second chamber being located above the third chamber, the first chamber having near its lower end an inlet for the air to be heated and near its upper end an outlet for the heated air to flow to the space to be heated, valve means for opening and closing said outlet, a radiator located in the upper part of the first chamber having an inlet and an outlet and gas passages connecting the last-named inlet and outlet, the outlet of the radiator extending outside the casing, a second casing located in the third chamber and having a combustion chamber with an inlet and an outlet and having a winding gas passage connecting the outlet of the combustion chamber to the inlet of the radiator, a storage tank for hot water located in the second chamber; piping connected to said tank, forming therewith a circulatory system and extending in part through said winding passage; a burner connected to and firing into the inlet of the combustion chamber, a first control for the burner responsive to the temperature of the water in said tank for starting the burner when the temperature of such water falls to one predetermined value and for stopping the burner when the temperature of such water rises to a second predetermined value; a second control for the burner adapted to respond to the temperature of the air in the space to be heated and operable independently of the first-named control to start the burner when the temperature in said space falls to one predetermined value, to continue the operation of the burner after the first control opens in response to the rise in temperature of the water in said tank, and to stop the burner when the temperature in said space rises to another predetermined value; and actuating means for said valve means responsive to the temperature of the water in said tank for opening and closing the valve means when the temperature of such water is respectively above or below a predetermined value higher than the second-named predetermined value.

5. A warm-air space-heating and hot-water heating apparatus, comprising, a casing, partitions dividing said casing into first, second and third chambers, the first chamber extending from the bottom to the top of said casing, the second and third chambers being located alongside the first chamber and the second chamber being located above the third chamber, the first chamber having near its lower end an inlet for the air to be heated and near its upper end an outlet for the heated air to flow to the space to be heated, the partition between the first and second chambers having openings one near the upper and one near the lower end of the second chamber, a valve for opening and closing one of said openings, a radiator in the upper part of the first chamber having an inlet and an outlet and gas passages interconnecting the last-named inlet and outlet, the last-named outlet extending outside said casing, a second casing located in the third chamber and having a combustion chamber with an inlet and an outlet and having a winding gas passage connecting the outlet of the combustion chamber to the inlet of the radiator, a storage tank for hot water located in the second chamber; piping connected to said tank, forming therewith a circulatory system and extending in part through said winding gas passage; a burner connected to and firing into the inlet of the combustion chamber, a first control for the burner responsive to the temperature of the water in said tank for starting the burner when the temperature of such water falls to one predetermined value and for stopping the burner when the temperature of such water rises to a second predetermined value; a second control for the burner adapted to respond to the temperature of the air in the space to be heated and operable independently of the first-named control to start the burner when the temperature in said space falls to one predetermined value, to continue the operation of the burner after the first control opens in response to the rise in temperature of the water in said tank, and to stop the burner when the temperature in said space rises to another predetermined value; and actuating means for said valve responsive to the temperature of the water in said tank for opening and closing said valve when the temperature of such water is respectively above or below a predetermined value higher than the second-named predetermined value.

6. A warm-air space-heating and hot-water heating apparatus, comprising, a casing, partitions dividing said casing into first, second and third chambers, the first chamber extending from the bottom to the top of said casing, the second and third chambers being located alongside the first chamber and the second chamber being located above the third chamber; the first chamber having near its lower end an inlet for the air to be heated and near its upper end an outlet for the heated air to flow to the space to be heated, valve means for opening and closing said outlet, the partition between the first and second chambers having openings one near the upper and one near the lower end of the second chamber, a valve for opening and closing one of said openings, a radiator in the upper part of the first chamber having an inlet and an outlet and gas passages interconnecting the last-named inlet and outlet, the last-named outlet extending outside the said casing, a second casing located in the third chamber and having a combustion chamber with an inlet and an outlet and having a winding gas passage connecting the outlet of the combustion chamber to the inlet of the radiator, a storage tank for hot water located in the second chamber; piping connected to said tank, forming therewith a circulatory system and located in part through said winding gas passage; a burner connected to and firing into the inlet of the combustion chamber, a first control for the burner responsive to the temperature of the water in said tank for starting the burner when the temperature of such water falls to one predetermined value and for stopping the burner when the temperature of such water rises to a second predetermined value; a second control for the burner adapted to respond to the temperature of the air in the space to be heated and operable independently of the first-named control to start the burner when the temperature in said space falls to one predetermined value, to continue the operation of the burner after the first control opens in response to the rise in temperature of the water in said tank, and to stop the burner when the temperature in said space rises to another predetermined value; and actuating means for said valve and valve means responsive to the temperature of the water in said tank for opening and closing the valve and valve means when the temperature of such water is respectively above or below a predetermined value higher than the second-named predetermined value.

CECIL A. P. THOMAS.

REFERENCES CITED

The following references are of record in the file of this patent:

UNITED STATES PATENTS

| Number | Name | Date |
| --- | --- | --- |
| 1,726,921 | Ray | Sept. 3, 1929 |
| 2,163,910 | Lattner | June 27, 1939 |
| 2,269,055 | Gower | Jan. 6, 1942 |
| 2,331,718 | Newton | Oct. 12, 1943 |
| 2,455,988 | Fife | Dec. 14, 1948 |